US012811204B2

(12) United States Patent
Chang et al.

(10) Patent No.: US 12,811,204 B2
(45) Date of Patent: Nov. 24, 2026

(54) ELECTROCHEMICAL SYSTEM SUPPRESSING $H_2$ BUBBLE FORMATION ON ELECTRIFIED PT ELECTRODE IN WATER-IN-SALT ELECTROLYTE SOLUTION

(71) Applicant: IUCF-HYU (Industry-University Cooperation Foundation Hanyang University), Seoul (KR)

(72) Inventors: Jinho Chang, Seoul (KR); Cheolmin Park, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 610 days.

(21) Appl. No.: 18/462,666

(22) Filed: Sep. 7, 2023

(65) Prior Publication Data

US 2024/0250314 A1 Jul. 25, 2024

(30) Foreign Application Priority Data

Sep. 7, 2022 (KR) ........................ 10-2022-0113754

(51) Int. Cl.
*H01M 10/42* (2006.01)
*C25B 1/04* (2021.01)
(Continued)

(52) U.S. Cl.
CPC ........... *H01M 10/4235* (2013.01); *C25B 1/04* (2013.01); *C25B 15/02* (2013.01); *H01M 4/38* (2013.01);
(Continued)

(58) Field of Classification Search
CPC .. H01M 10/4235; H01M 10/38; H01M 10/92; H01M 8/08; H01M 8/188;
(Continued)

(56) References Cited

U.S. PATENT DOCUMENTS 11,639,554 B1 * 5/2023 Wang ........................ C25B 1/04
205/337
2025/0030047 A1 * 1/2025 Widstrom ........... H01M 10/052

FOREIGN PATENT DOCUMENTS

KR 20200114962 A 10/2020
KR 20210132303 A 11/2021

OTHER PUBLICATIONS

Coustan et al. (Electrochemical behavior of platinum, gold and glassy carbon electrodes in water-in-salt electrolyte, Electrochemistry Communications, 2017 ,https://doi.org/10.1016/j.elecom.2017.03.001). (Year: 2017).*

(Continued)

*Primary Examiner* — Kimberly Wyluda
(74) *Attorney, Agent, or Firm* — CANTOR COLBURN LLP

(57) ABSTRACT

An electrochemical system is provided including a Pt electrode and a water-in-salt electrolyte solution and induces a redox reaction of hydrogen gas by applying a negative potential to the Pt electrode, wherein the water-in-salt electrolyte solution includes an aqueous solvent and an salt, wherein the salt includes lithium bis(trifluoromethanesulfonyl)imide (LiTFSI), lithium trifluoromethane sulfonate (LiOTf), lithium bis(fluorosulfonyl)imide (LiFSI), lithium bis (pentafluoroethane sulfonyl)imide (LiBETI), or a combination thereof, and a molal concentration of the water-in-salt electrolyte is 5 m to 50 m, to suppress formation of hydrogen gas bubbles on the Pt electrode to which the negative potential is applied.

10 Claims, 31 Drawing Sheets

(51) Int. Cl.
*C25B 15/02* (2021.01)
*H01M 4/38* (2006.01)
*H01M 4/92* (2006.01)
*H01M 8/08* (2016.01)
*H01M 8/18* (2006.01)
*H01M 10/36* (2010.01)

(52) U.S. Cl.
CPC .............. *H01M 4/92* (2013.01); *H01M 8/08* (2013.01); *H01M 8/188* (2013.01); *H01M 10/36* (2013.01); *H01M 2300/0002* (2013.01)

(58) Field of Classification Search
CPC . H01M 10/36; H01M 2300/0002; C25B 1/04; C25B 15/02
See application file for complete search history.

(56) References Cited

OTHER PUBLICATIONS

German et al., "Critical Nuclei Size, Rate, and Activation Energy of H2 Gas Nucleation" Journal of the American Chemical Society, Feb. 23, 2018, 1-24.

Popov et al, "Critical Role of Anion-Solvent Interactions for Dynamics of Solvent-in-Salt Solutions", The Journal of Physical Chemistry C, Published Mar. 27, 2020, p. 1-10.

Luo et al., "Electrogeneration of Single Nanobubbles at Sub-50-nm-Radius Platinum Nanodisk Electrodes", Langmuir, 2013, 29, 11169-11175.

Deng et al., "Ionosomes: Observation of Ionic Bilayer Water Clusters", J. Am. Chem. Soc., 2021, 143, 7671-7680.

Aoki et al., "Is hydrogen gas in water present as bubbles or hydrated form", Journal of Electroanalytical Chemistry, 668 (2012), 83-89.

Zhang et al., "Potential-Dependent Layering in the Electrochemical Double Layer of Water-in-Salt Electrolytes", Applied energy Materials, 2020,3, 8086-8094.

Groves et al., "Surface Forces and Structure in a Water-in-Salt Electrolyte", The Journal of Physical Chemistry Letters, 2021, 12, 1702-0707.

Mceldrew et al., "Theory of the Double Layer in Water-in-Salt Electrolytes", The Journal of Physical Chemistry Letters, Sep. 19, 2018, p. 1-11.

Liu et al., "Visualization and Quantification of Electrochemical H2 Bubble Nucleation at Pt, Au and MoS2 Substrates" ACS Sensors, May 24, 2020, 1-9.

Borodin et al.,, "Liquid Structure with Nano-Heterogeneity Promotes Cationic Transport in Concentrated Electrolytes", ACS Nano, 2017, 11, 10462-10471.

Vatamanu et al.,, "Ramifications of Water-in-Salt Interfacial Structure at charged Electrodes for Electrolyte Electrochemical Stability", The Journal of Physical Chemistry, Letters, 2017, 8, 4362-4367.

Suo et al., ""Water-in-Salt" electrolyte enables high-voltage aqueous lithium-ion chemistries", Science, Nov. 20, 2015, vol. 350 Issue 6263, 938-943.

* cited by examiner

FIG. 1B1
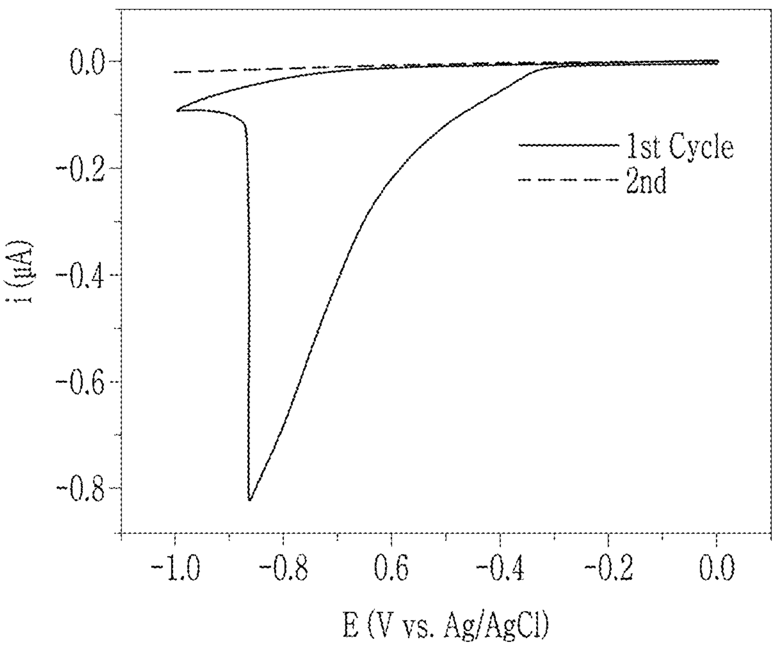

FIG. 1B2
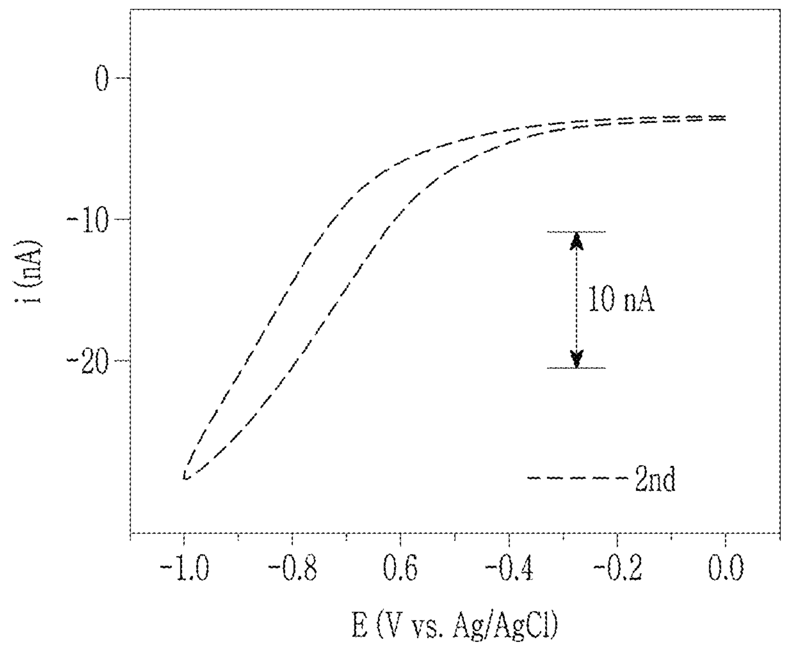

ELECTROCHEMICAL SYSTEM SUPPRESSING $H_2$ BUBBLE FORMATION ON ELECTRIFIED PT ELECTRODE IN WATER-IN-SALT ELECTROLYTE SOLUTION

BACKGROUND OF THE INVENTION

(a) Field of the Invention

This relates to an electrochemical system in which bubble formation on a Pt electrode in a water-in-salt electrolyte solution is suppressed and a reversible redox reaction of hydrogen gas is induced.

(b) Description of the Related Art

Research on an electrochemical redox reaction of hydrogen gas ($H_2$) in an aqueous electrolyte system is being extensively conducted. However, the hydrogen gas has low solubility in an aqueous solvent and so exists in a bubble state rather than in a hydrated state by being dissolved therein and thus generates a large amount of gas bubbles on the electrode surface, which acts as a main factor inhibiting a reaction rate of the electrochemical system.

SUMMARY OF THE INVENTION

A method is provided to effectively suppress bubble formation by increasing a solubility of hydrogen gas on an electrode surface to which an electric potential is applied, thereby inducing a reversible redox reaction of hydrogen gas.

In an embodiment, an electrochemical system is provided that includes a Pt electrode and a water-in-salt electrolyte solution wherein the electrochemical system induces a redox reaction of hydrogen gas by applying a negative potential to a Pt electrode, and formation of hydrogen gas bubbles is successfully suppressed on the Pt electrode to which the negative potential is applied. The water-in-salt electrolyte solution includes an aqueous solvent and a salt, and the salt includes lithium bis(trifluoromethanesulfonyl)imide (LiTFSI), lithium trifluoromethane sulfonate (LiOTf), lithium bis(fluorosulfonyl)imide (LiFSI), lithium bis(pentafluoroethane sulfonyl)imide (LiBETI), or a combination thereof, and a molal concentration of the water-in-salt electrolyte solution is 5 m to 50 m.

According to an embodiment, the solubility of hydrogen gas increases at the interface of the Pt electrode to which a potential is applied, thereby effectively suppressing the bubble formation, and thereby increasing the reversibility of the oxidation-reduction reaction of hydrogen gas.

BRIEF DESCRIPTION OF THE DRAWINGS

FIGS. 2(*d*) and (*e*) are $i_{pa}/i_{pc}$ graphs for Examples 1 and 2 and Comparative Examples 2 and 3. FIG. 2(*f*) shows $k_{app,H2\ bubble}$ histograms for Examples 1 and 2 and Comparative Examples 2 and 3.

FIG. 3(*a*) is a photograph of Comparative Example 3 of 6 m of LiCl, and FIG. 3(*b*) is a photograph of Example 1 of 6 m of LiTFSI.

FIG. 4(*e*) is a diagram schematically showing the hydrogen bubble formation mode according to various electrolyte types measured through EQCM.

FIG. 6(*e*) is a diagram schematically showing the electrode-oxidation reaction of $H_2$ occurring at the IFL_ of the Pt electrode in 6 m of LiTFSI salt-in-salt water. FIG. 6(*f*) is a graph showing Ca before and after 10 cycles in the electrolyte solutions of Examples 1 and 2 and Comparative Examples 2 and 3.

FIG. 8(*b*) is a graph showing the change in frequency over time by measuring EQCM at different concentrations of 3 m, 4 m, 5 m, and 6 m LiTFSI in Comparative Example 4. FIG. 8(*c*) is a CV graph when applying the 6 m of LiTFSI electrolyte solution without $HClO_4$ and before and after applying −1 V while injecting $H_2$ in Comparative Example 4. FIG. 8(*d*) is a diagram schematically showing the different $H_2$ electrode-oxidation mechanisms seen in each of the Pt electrode and Au electrode.

DETAILED DESCRIPTION OF THE EMBODIMENTS

Figure 1A:
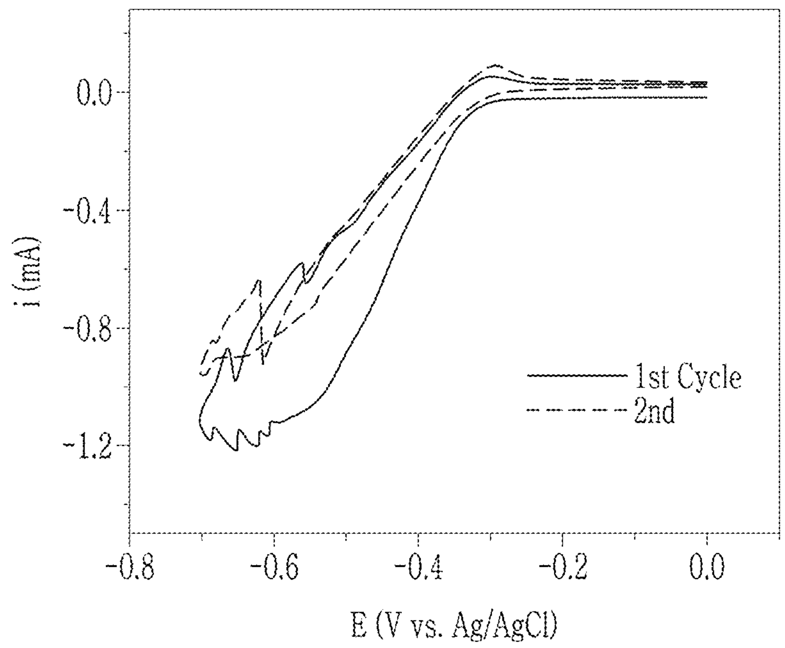
FIG. 1(*a*) is a cyclic voltammetry (CV) graph for Pt MDE of Comparative Example 1, FIG. 1(*b*) is a CV graph for Pt UME of Comparative Example 1, FIG. 1(*c*) is a CV graph for Pt MDE of Example 1, and FIG. 1(*d*) is a CV graph for Pt UME of Example 1.

Hereinafter, embodiments of the present invention are described in detail so that those of ordinary skill in the art can easily implement the present invention. However, this disclosure may be embodied in many different forms and is not construed as limited to the example embodiments set forth herein.

Hereinafter, “combination thereof” refers to a mixture, a laminate, a composite, a copolymer, an alloy, a blend, or a reaction product of constituents.

Herein, it should be understood that terms such as “comprises,” “includes,” or “have” are intended to designate the presence of an embodied feature, number, step, element, or a combination thereof, and it does not preclude the possibility of the presence or addition of one or more other features, number, step, element, or a combination thereof.

In the drawings, the thickness of layers, regions, etc., are exaggerated for clarity. It will be understood that when an element such as a layer, film, region, or substrate is referred to as being “on” another element, it can be directly on the other element or intervening elements may also be present. In contrast, when an element is referred to as being “directly on” another element, there are no intervening elements present. “Layer” herein includes not only a shape formed on the whole surface when viewed from a plan view, but also a shape formed on a partial surface.

Herein, “or” is not to be construed as an exclusive meaning, for example, “A or B” is construed to include A, B, A+B, and the like.

In an embodiment, an electrochemical system includes a Pt electrode and a salt-in-water electrolyte solution and induces an oxidation-reduction reaction of hydrogen gas by applying a negative potential to the Pt electrode, whereby the bubble formation of hydrogen gas on a Pt electrode to which a negative potential is applied is successfully suppressed to provide an electrochemical system capable of inducing a reversible oxidation-reduction reaction of hydrogen gas. The water-in-salt electrolyte solution includes an aqueous solvent and a salt, and the salt includes lithium bis(trifluoromethanesulfonyl)imide (LiTFSI), lithium trifluoromethane sulfonate (LiOTf), lithium bis(fluorosulfonyl) imide (LiFSI), lithium bis(pentafluoroethane sulfonyl)imide (LiBETI), or a combination thereof, and a molal concentration of the water-in-salt electrolyte is 5 m to 50 m.

The aqueous solvent of the water-in-salt electrolyte solution may include water, an alcohol-based solvent, or a combination thereof, and may, for example, refer to a solvent including 80 volume % or more of water.

The molal concentration of the water-in-salt electrolyte is 5 m to 50 m, for example, may be 5 m to 40 m, 5 m to 30 m, 5 m to 20 m, 5 m to 15 m, or 6 m to 50 m. When the above concentration range is satisfied, bubble formation on the surface of the Pt electrode is suppressed and a reversible oxidation-reduction reaction of hydrogen gas can be effectively induced.

Research on the electrochemical oxidation-reduction reaction of hydrogen gas ($H_2$) in an aqueous electrolyte system is being conducted extensively. However, in aqueous solvents, hydrogen gas exists in a bubble state rather than being dissolved in a hydrated state. Therefore, the solubility of hydrogen gas in an aqueous solution including 1 M NaCl at normal pressure is only about 0.6 mM. On the other hand, in an embodiment, by adding a compound that is a raw material for hydrogen gas to a specific water-in-salt electrolyte solution and applying a negative potential to the Pt electrode, the properties of the Pt electrode surface are changed so that hydrogen gas is stabilized in a dissolved state rather than forming bubbles. Accordingly, it is possible to enable a reversible oxidation-reduction reaction of hydrogen gas on the Pt electrode surface and to improve the speed of the oxidation-reduction reaction.

Herein, the electrochemical system may be expressed as an electrochemical device, and may be, for example, a fuel cell, a hydrogen storage system, an electrode analysis system, an electrolysis device, a redox flow battery, a capacitor, or a rechargeable battery, but is not limited thereto.

The compound that serves as a raw material for hydrogen gas may be, for example, an acidic solution such as $HClO_4$.

The voltage range applied to the Pt electrode may be, for example, −0.1 V to −1.0 V.

1. Cyclic Voltammetry Analysis of Hydrogen Formation Reaction According to Type of Electrolyte

Comparative Example 1

Figure 1C:
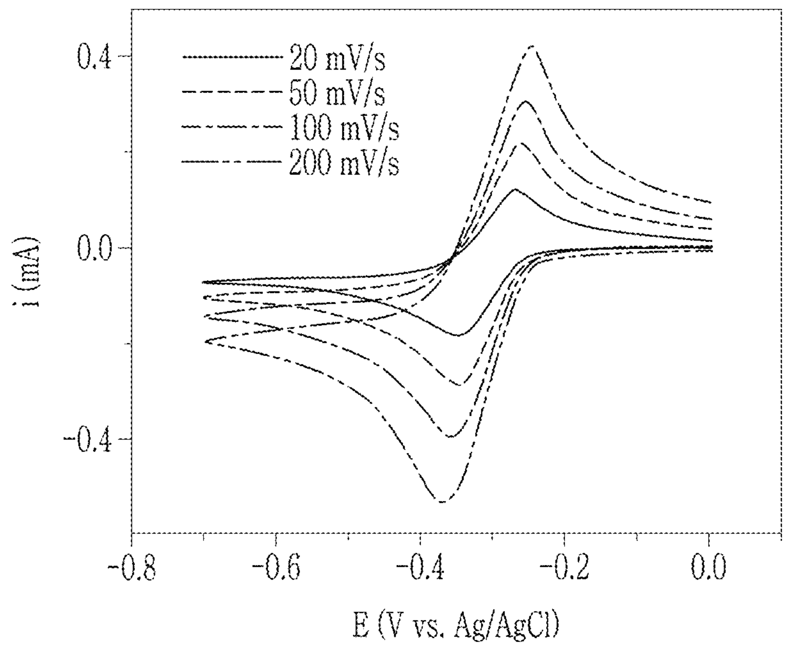
Figure 1D:
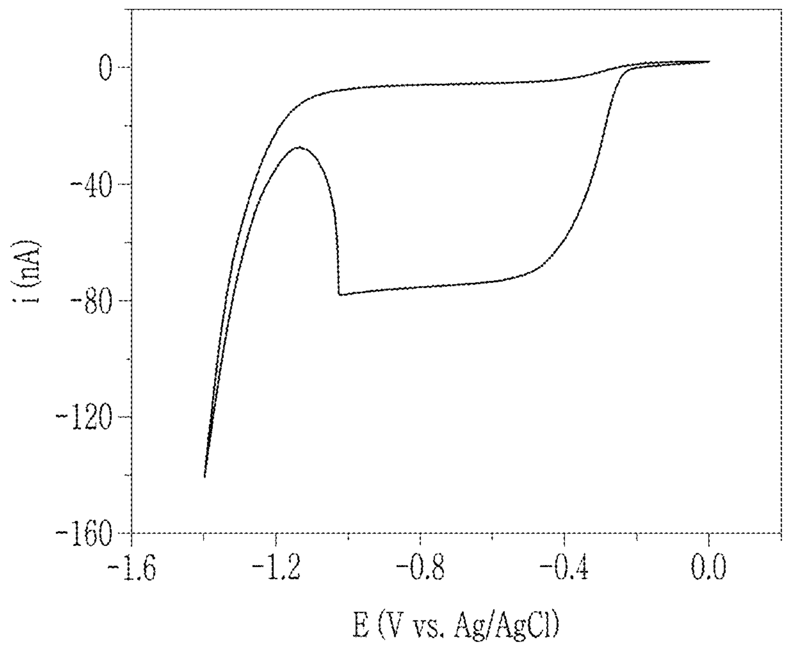
Figure 2A:
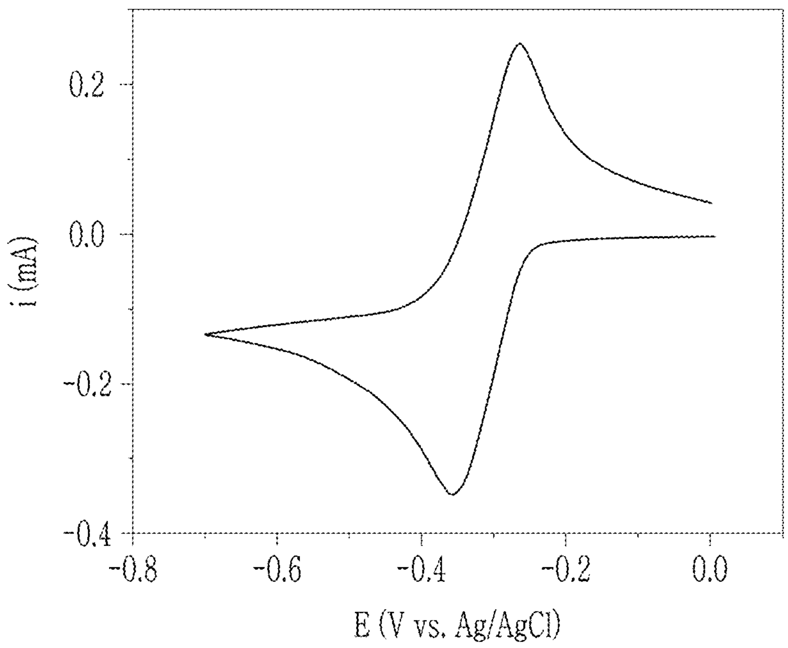
FIG. 2(*a*) is a CV graph of Example 2, FIG. 2(*b*) is a CV graph of Comparative Example 2, and FIG. 2(*c*) is a CV graph of Comparative Example 3.
Figure 2B:
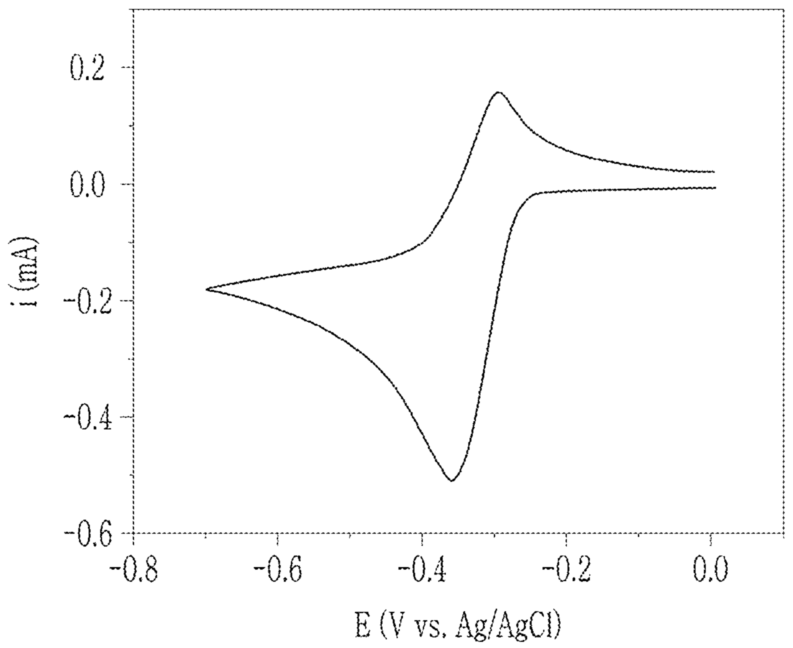
Figure 2C:
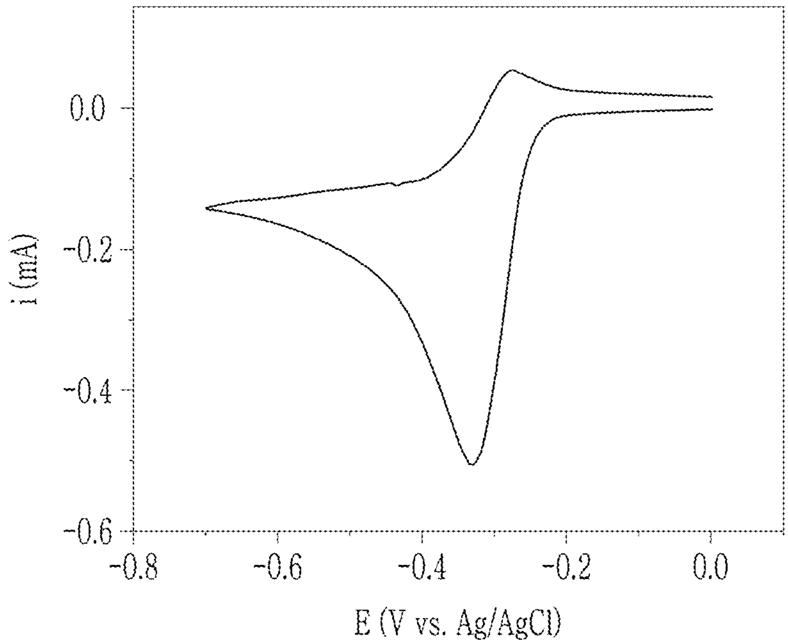
Figure 2D:
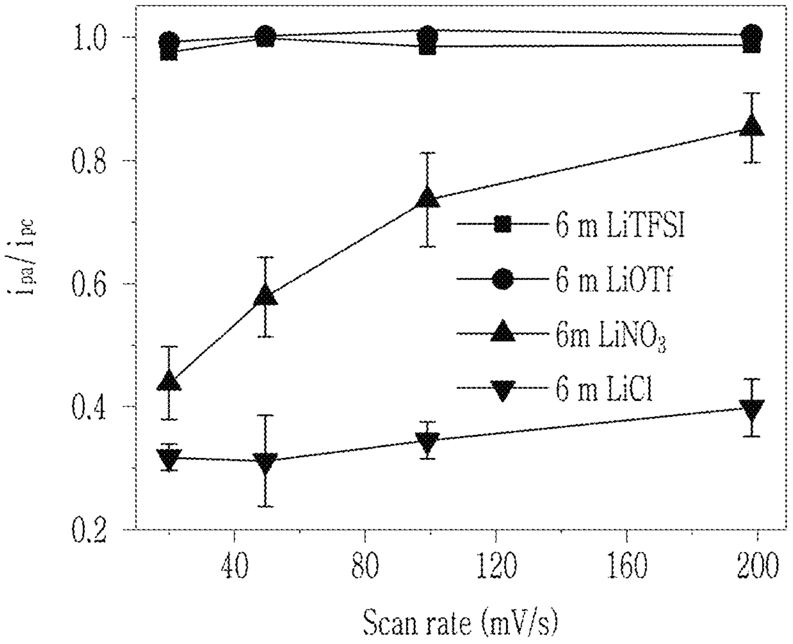
Figure 2E:
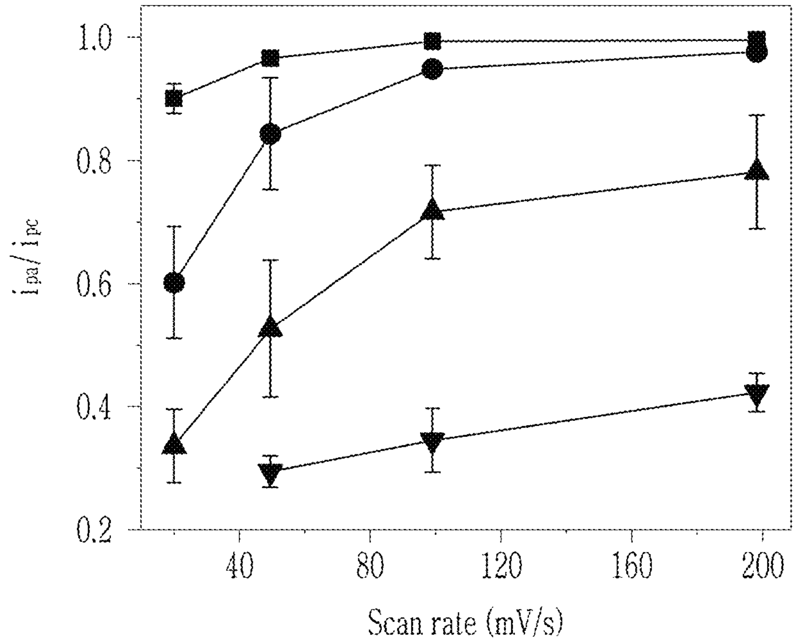
Figure 2F:
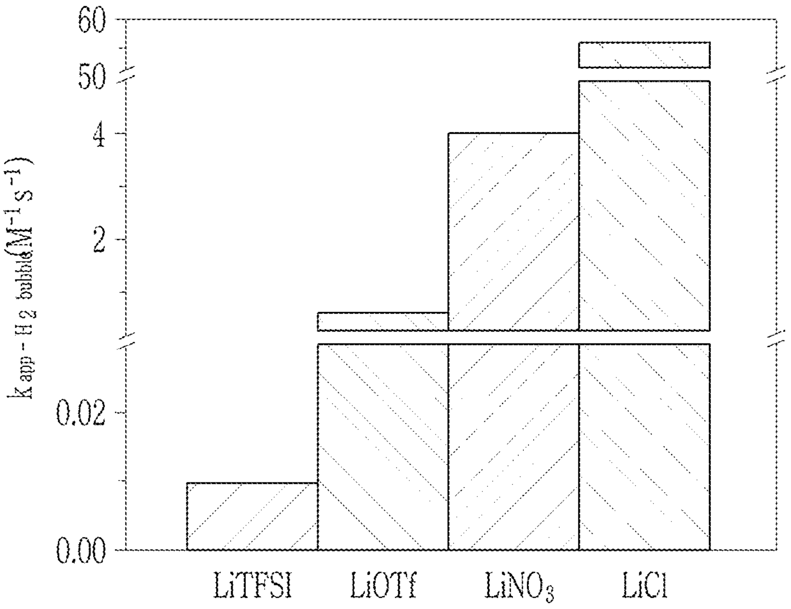

An electrochemical cell according to Comparative Example 1 was manufactured by using a Pt macro disk electrode (MDE) as a working electrode, Ag/AgCl (1 M KCl) as a reference electrode, a Pt wire as a counter electrode, and an acidic solution prepared by adding 50 mM of $HClO_4$ to distilled water as a basic electrolyte solution. FIG. 1(*a*) is a CV graph showing first and second cycles of the cell for a hydrogen evolution reaction (HER) in the Pt MDE of Comparative Example 1. Since $H_2$ bubbles generated on the electrode surface made the surface unstable, a current containing a noise signal due to the unstable surface is observed. In addition, Comparative Example 1 exhibited almost no hydrogen oxidation-reduction peak on the Pt MDE surface, which confirms that the $H_2$ bubbles were rapidly produced under this electrolyte solution condition.

Subsequently, the working electrode was changed to a Pt ultramicro electrode (UME) to manufacture an electrochemical cell, of which a CV graph showing the first and second cycles is shown in (b) of FIG. 1. When a hydrogen evolution reaction (HER) occurs at a Pt UME, a current rapidly decreases, before a reduction peak appears, because a reaction region is limited, as $H_2$ bubbles generated on the electrode surface block the electrode. FIG. 1(*b*) confirms that about 88% of the surface of the Pt UME was blocked by the $H_2$ bubbles and accordingly, that there was almost no oxidation-reduction peak of $H_2$.

Example 1

An electrochemical cell according to Example 1 was manufactured substantially in the same manner as in Comparative Example 1 except that a "Water-in-LiTFSI" electrolyte solution prepared by adding 6 m of LiTFSI to the basic electrolyte solution was used. FIG. 1(*c*) shows a CV graph at a scan rate of 20, 50, 100, and 200 mV/s of Example 1. In Example 1, a current less including the noise signal was observed than in Comparative Example 1, and a hydrogen oxidation-reduction peak was also confirmed.

In addition, referring to FIG. 1(*c*), a ratio ($i_{pa}/i_{pc}$) of an anode voltage-based peak current ($i_{pa}$) to a cathode voltage-based peak current ($i_{pc}$) at all the scan rates was calculated to about ~1. This means that the $H^+/H_2$ oxidation-reduction reaction is completely reversible and also, that electrically formed $H_2$ may exist in a dissolved state in the electrolyte solution rather than as bubbles.

Subsequently, the working electrode was changed to Pt UME to manufacture an electrochemical cell, and a CV graph thereof is shown in FIG. 1(*d*). Referring to FIG. 1(*d*), compared with Comparative Example 1 to which LiTFSI was not added, Example 1 to which 6 m of LiTFSI was added exhibited no sudden current decrease, which confirms that the $H_2$ bubble formation was suppressed.

Referring to the results of FIG. 1, when the water-in-salt electrolyte solution prepared by applying 6 m of LiTFSI was applied, the $H_2$ bubble formation on the Pt electrode surface by HER was effectively suppressed, which confirms that a reversible $H^+/H_2$ oxidation-reduction reaction was successfully induced on the Pt electrode surface.

Such an effect may vary depending on types of an electrolyte solution, which may be confirmed through Example 2 and Comparative Examples 2 and 3 below.

Example 2

An electrochemical cell was manufactured substantially in the same manner as in Example 1 except that 6 m of LiOTf was used instead of 6 m of LiTFSI.

Comparative Example 2

An electrochemical cell was manufactured substantially in the same manner as in Example 1 except that 6 m of $LiNO_3$ was used instead of 6 m of LiTFSI.

Comparative Example 3

An electrochemical cell was manufactured substantially in the same manner as in Example 1 except that 6 m of LiCl was used instead of 6 m of LiTFSI.

FIG. 2(*a*) is a CV graph at 50 mV/s of Example 2, FIG. 2(*b*) is a CV graph at 50 mV/s of Comparative Example 2, and FIG. 2(*c*) is a CV graph at 50 mV/s of Comparative Example 3. In FIG. 2(*a*), $i_{pa}/i_{pc}$ of Example 2 was calculated to be about ~1, which means that the $H^+/H_2$ oxidation-reduction reaction was completely reversible. On the contrary, in FIG. 2(*b*), Comparative Example 2 using 6 m of $LiNO_3$ exhibited that $i_{pa}/i_{pc}$ decreased down to about 0.6, and in FIG. 2(*c*), Comparative Example 3 using 6 m of LiCl exhibited that $i_{pa}/i_{pc}$ decreased down to about 0.3, which confirms that the oxidation-reduction reaction was irreversible.

FIGS. 2(*d*) and (*e*) show $i_{pa}/i_{pc}$ changes according to various scan rates, which were measured for the electrochemical cells of Examples 1 and 2 and Comparative Examples 2 and 3. FIG. 2(*d*) is a case of adding 50 mM of $HClO_4$, and FIG. 2(*e*) is a case of adding 100 mM of $HClO_4$. Referring to FIG. 2(*d*) and (*e*), Examples 1 and 2 exhibited a completely reversible oxidation-reduction reaction at all the scan rates, but Comparative Examples 2 and 3 exhibited an irreversible oxidation-reduction reaction at all the scan rates.

FIG. 2(*f*) shows forward reaction constant ($k_{app,H2\ bubble}$) histograms of Reaction Scheme 1 for the electrochemical cells of Examples 1 and 2 and Comparative Examples 2 and 3.

Reaction Scheme 1

$$2H_2 \rightleftharpoons (H_2)_2$$

Referring to FIG. 2(*f*), Example 1 exhibited the constant of about 0.01 $M^{-1}s^{-1}$, which confirms that the $H_2$ bubble formation was mechanically well suppressed.

According to an embodiment, in the acidic solutions of 6 m of LiTFSI and 6 m of LiOTf, the $H_2$ bubble formation was suppressed, thereby increasing solubility of hydrogen therein, securing a reversible $H^+/H_2$ oxidation reduction reaction, and improving a reaction rate, but in the 6 m of $LiNO_3$ and 6 m of LiCl electrolytes, there was almost no reversible oxidation-reduction behavior, which was confirmed through voltammetry.

2. Monitoring Hydrogen Bubble Formation Through EQCM

Below, whether or not the $H_2$ bubble formation was mechanically suppressed during the electrode-reduction of $H^+$ at a Pt electrode was monitored through EQCM (electrochemical quartz crystal microbalance) in a macroscopic method. In order to analyze the EQCM, an electrochemical cell was manufactured by using Pt as an working electrode, a stainless steel rod as a counter electrode, and Ag/AgCl (1 M KCl) as a reference electrode, and as in Examples 1 and 2 and Comparative Examples 2 and 3, used was an electrolyte solution prepared by respectively adding 6 m of LiTFSI, LiOTf, $LiNO_3$, and LiCl to a basic electrolyte solution, which was prepared by dissolving 50 mM of $HClO_4$ in distilled water.

Figure 3A:
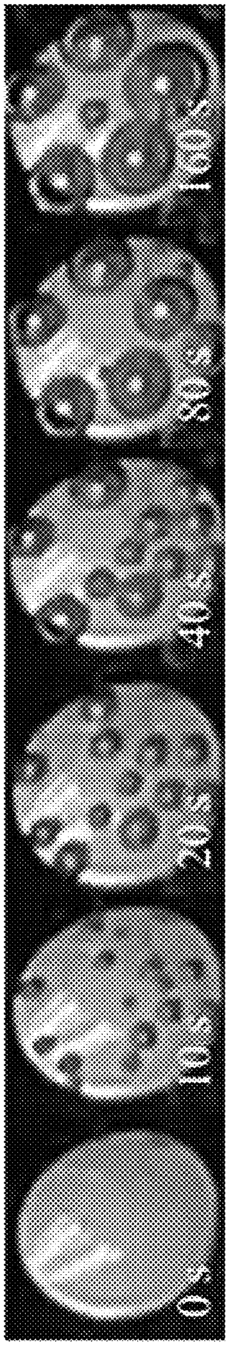
FIG. 3 is a snapshot over time of the formation of $H_2$ bubbles during electrode-reduction of $H^+$ at the Pt MDE to which a potential of −0.7 V is applied.
Figure 3B:
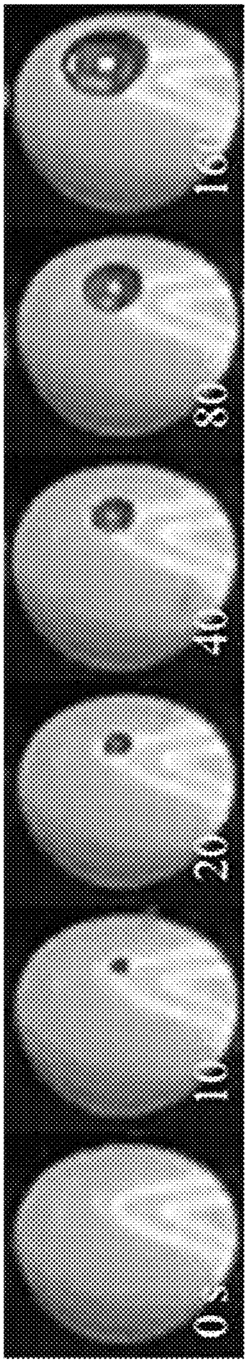
Figure 4A:
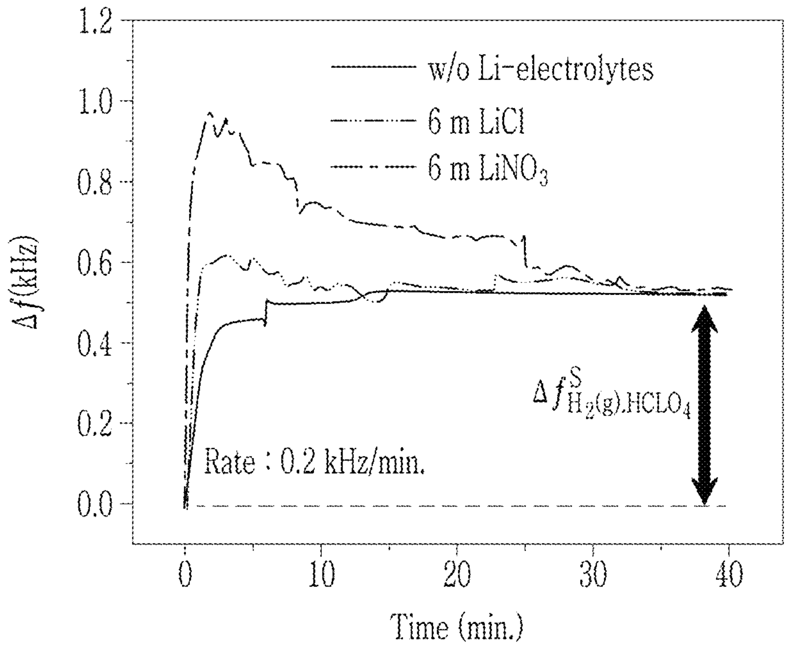
FIG. 4(*a*) to (*d*) are graphs showing frequency changes over time measured through EQCM analysis in Examples 1 and 2 and Comparative Examples 1 to 3.
Figure 4B:
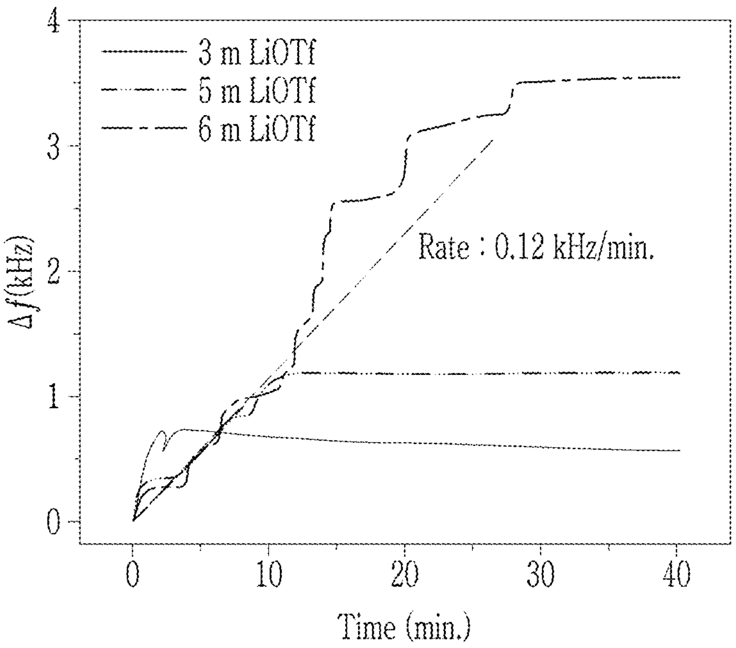
Figure 4C:
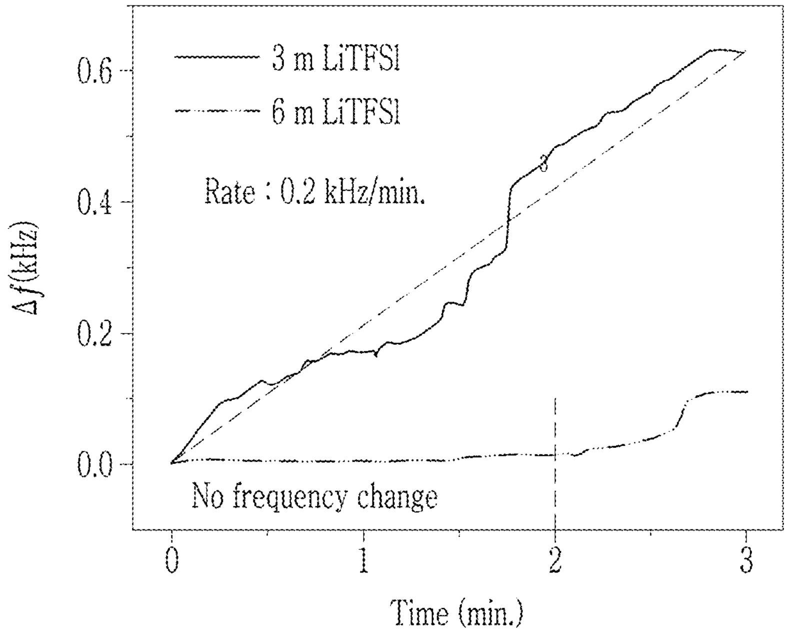
Figure 4D:
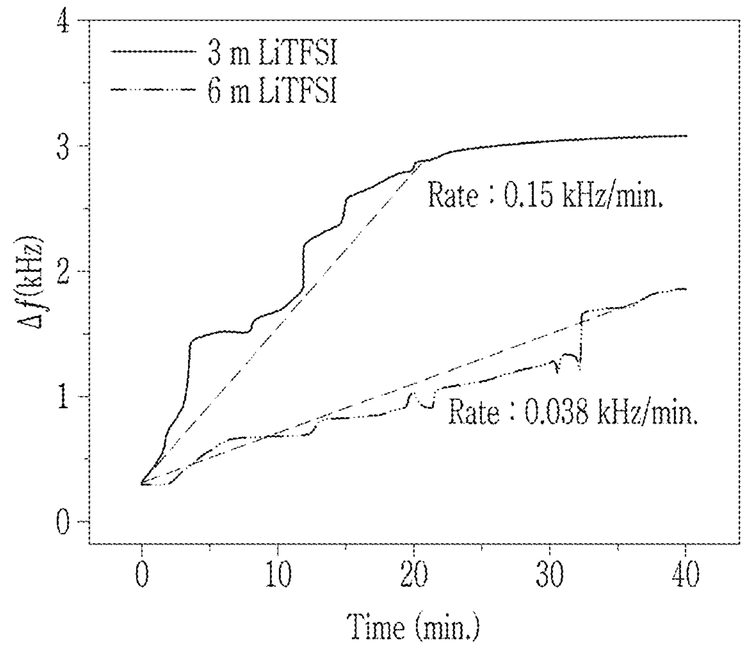
Figure 4E:
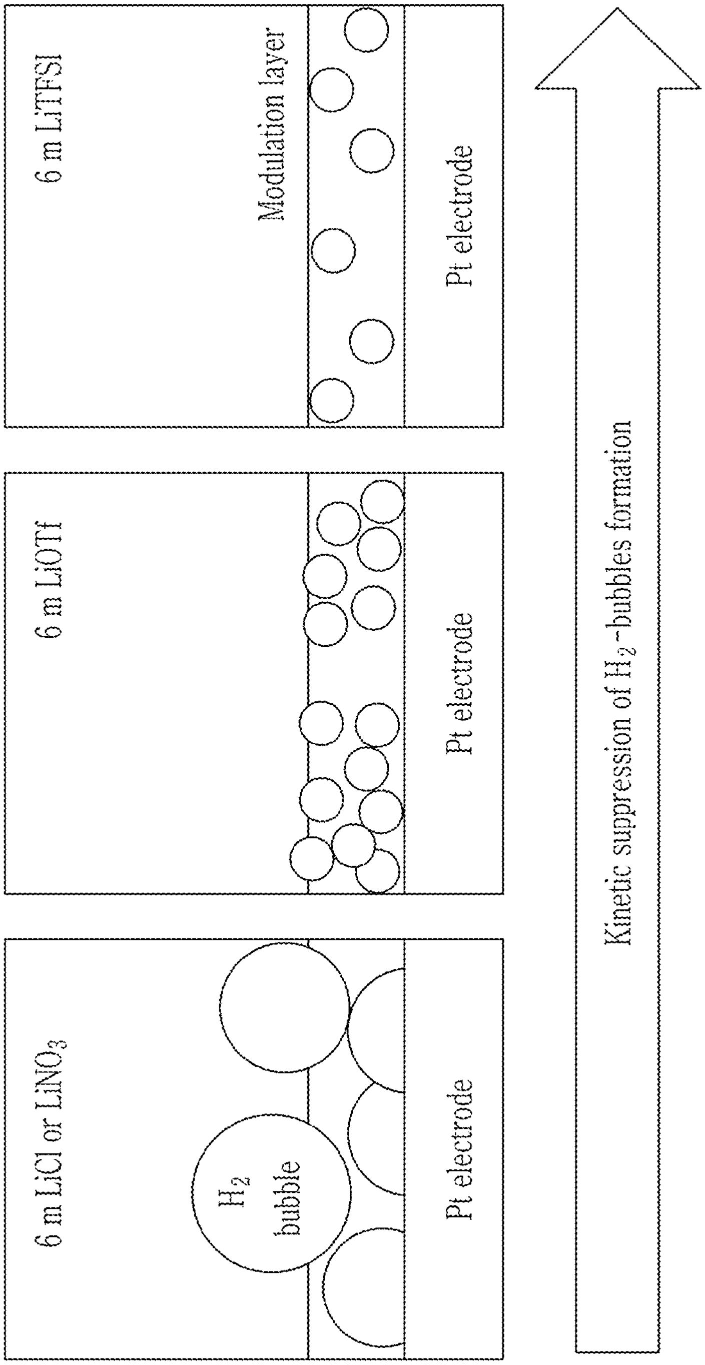

FIG. 3 is a snapshot over time taking the $H_2$ bubble formation during electrode-reduction of $H^+$ at the Pt MDE to which a potential of −0.7 V was applied. FIG. 3(*a*) is a photograph of Comparative Example 3 including 6 m of LiCl, and FIG. 3(*b*) is a photograph of Example 1 including 6 m of LiTFSI. FIG. 3(*a*) shows that lots of $H_2$ bubbles were formed on the entire Pt electrode surface, and after 160 seconds, the bubbles grew larger and covered the electrode surface. On the contrary, referring to FIG. 3(*b*), after 10 seconds, only one bubble was locally formed with no other bubbles, which confirms that the bubble formation was surely suppressed, compared with FIG. 3(*a*).

Below, bubble formation characteristics of the electrolytes at various concentrations were analyzed through the EQCM. Frequency changes (Δf) over time were measured during the electrode-reduction of $H^+$ at the Pt electrode by applying −0.6 V of a potential, and the results are shown in FIG. 4(*a*) to (*d*). Herein, it is known that a frequency increase according to the hydrogen bubble formation is mainly due to replacement of liquid with gas mainly in an interfacial layer modified on the electrode surface. Accordingly, in FIG. 4(*a*), referring to a black graph, corresponding to Comparative Example 1 to which a lithium salt was not added, a Δf curve shows that hydrogen bubbles were rapidly formed and surrounded the Pt electrode surface and eventually, completely covered the entire electrode surface. In FIG. 4(*a*), Comparative Example 3 using 6 m of LiCl and Comparative Example 2 using 6 m of $LiNO_3$ exhibited a higher initial $H_2$ generation rate than Comparative Example 1 but eventually converged as shown in the graph of Comparative Example 1. This indicates that the electrodes of Comparative Examples 2 and 3 were covered with $H_2$ within a similar range.

FIG. 4(*b*) is a graph showing frequency changes over time when LiOTf at various molal concentrations of 3 m, 5 m, and 6 m was applied. When 3 m of LiOTf was applied, a similar result to 6 m of LiCl or 6 m of $LiNO_3$ was obtained. When LiOTf was included at a concentration of 5 m or more, Δf increased and then, converged at $\Delta f_{H2(g)}{}^{s}$=1.18 kHz. When LiOTf was included at a concentration of 6 m, $\Delta f_{H2(g)}{}^{s}$ increased to 3.57 kHz, which is approximately 7 times that of 3 m of LiOTf.

FIGS. 4(*c*) and (*d*) are graphs of Δf over time when 3 m of LiTFSI and 6 m of LiTFSI were applied: FIG. 4(*c*) is the result for a short time of less than 3 minutes and FIG. 4(*d*) is the result for a long time of about 40 minutes. When 3 m of LiTFSI was applied, Δf/Δt was calculated to be 0.20 KHz/min in the short time region and 0.15 kHz/min in the long time region, which confirms that hydrogen bubbles were less formed than a case of adding no lithium salt. When the concentration of LiTFSI was increased to 6 m, there was almost no frequency change according to the hydrogen bubble formation in the short time region of 2 minutes, but even after 2 minutes, as the frequency slightly increased, an overall hydrogen bubble formation rate was calculated to be about 0.038 kHz/min, which is four times that of 3 m of LiTFSI. This means that the hydrogen bubble formation was effectively suppressed by HER in 6 m of LiTFSI. FIG. 4(*e*) schematically shows a hydrogen bubble formation mode according to various types of electrolytes through EQCM.

Figure 5:
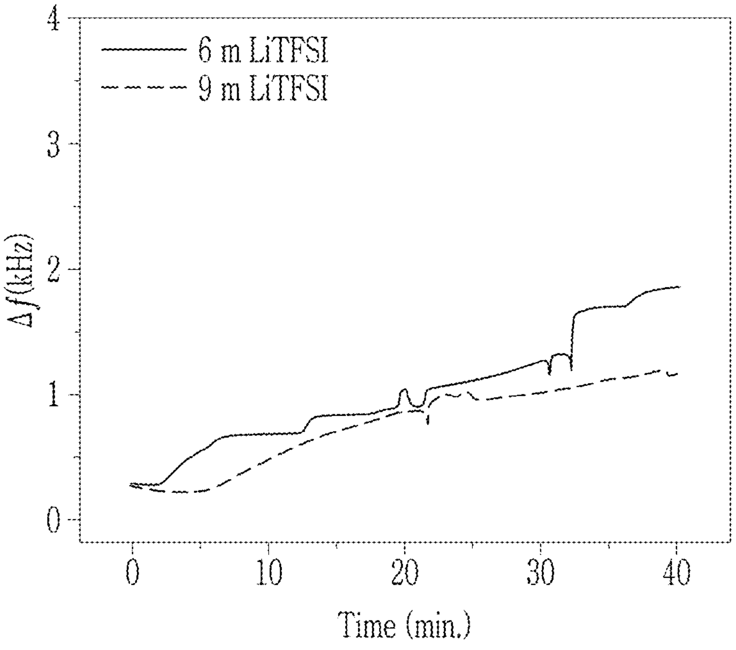
FIG. 5 is a graph showing the frequency change over time when 6 m of LiTFSI and 9 m of LiTFSI are applied.
Figure 6A:
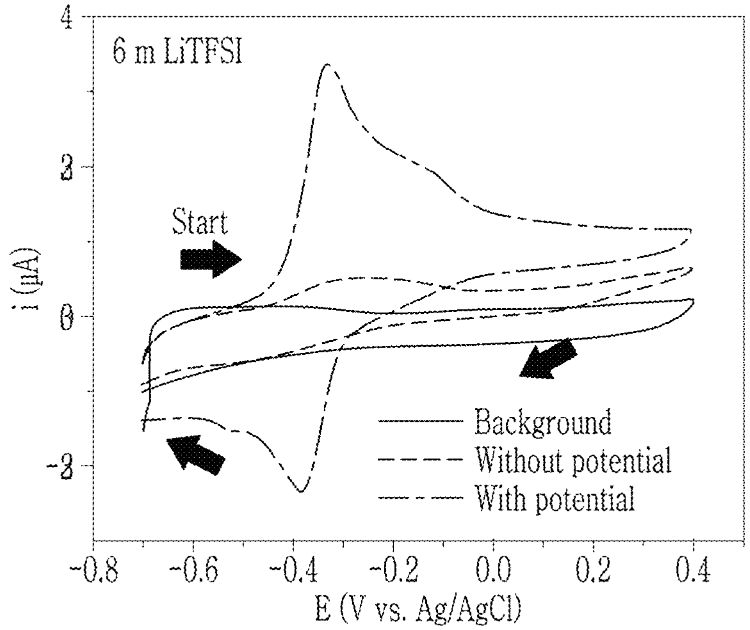
FIG. 6(*a*) to (*d*) are CV graphs of Example 1, Example 2, Comparative Example 3, and Comparative Example 2 in that order.
Figure 6B:
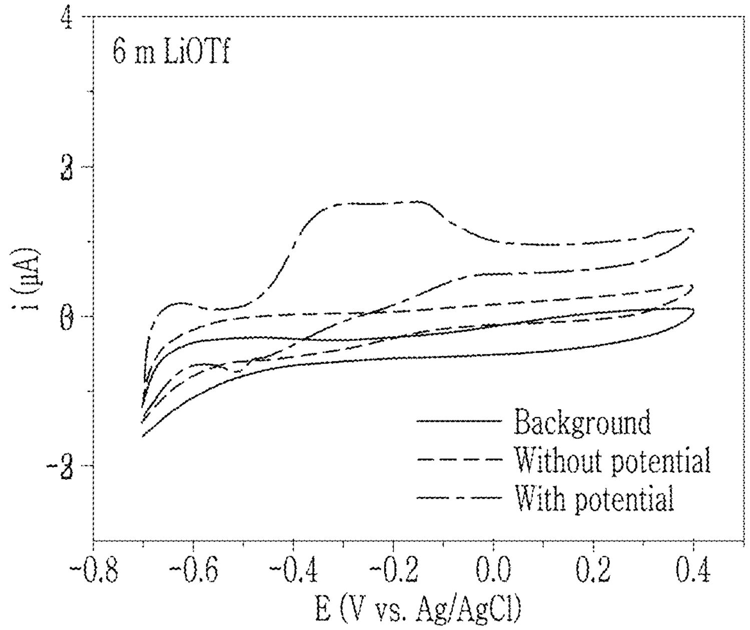
Figure 6C:
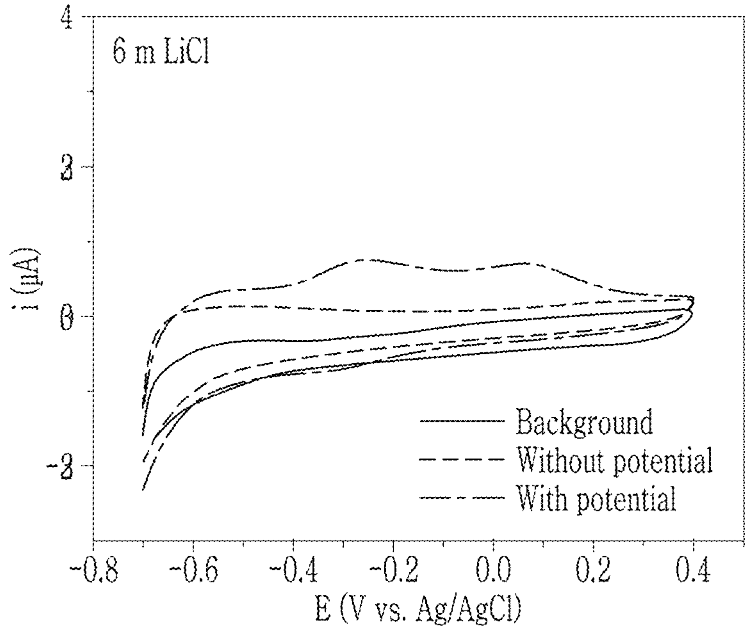
Figure 6D:
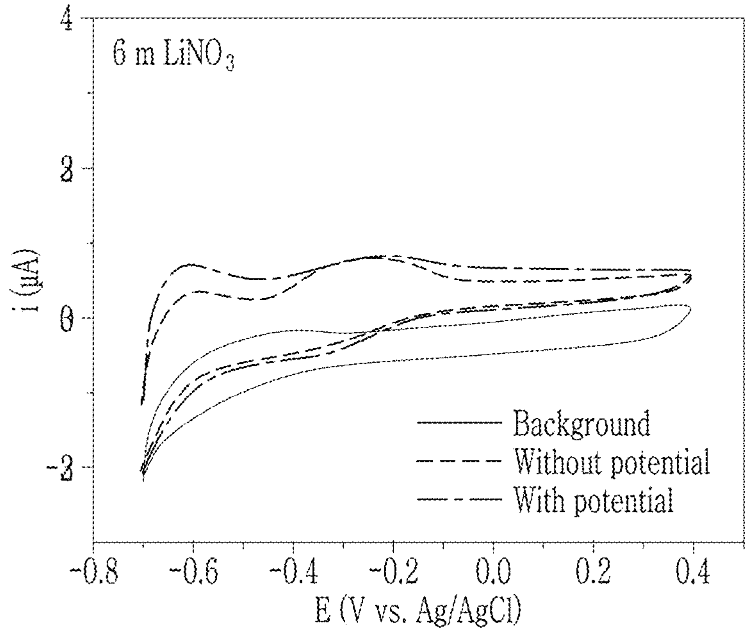
Figure 6E:
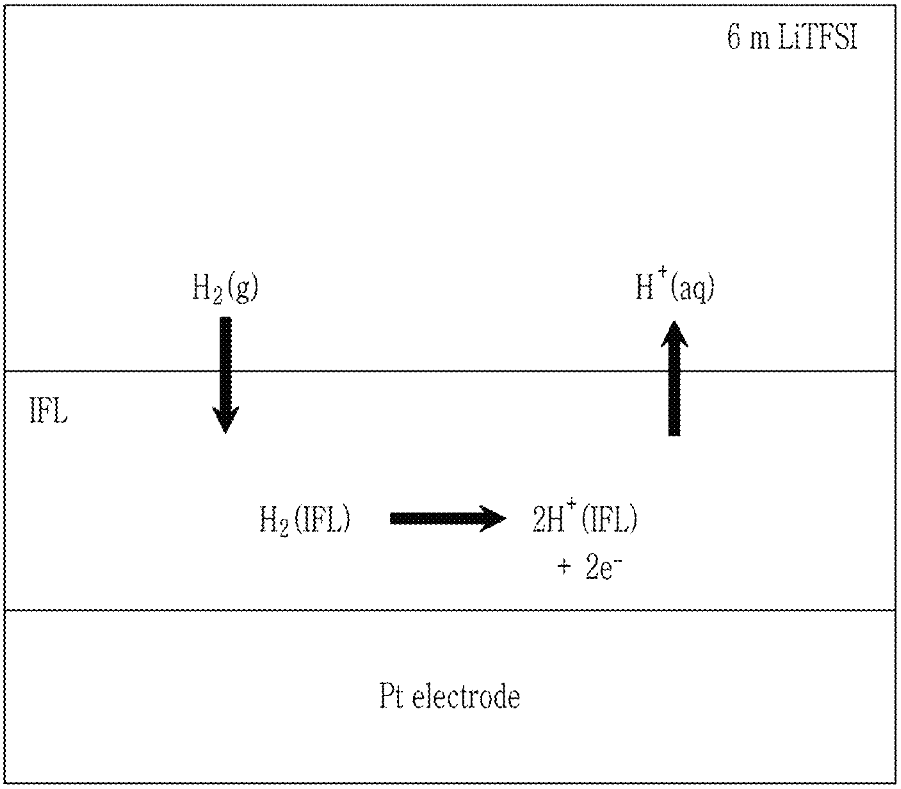
Figure 6F:
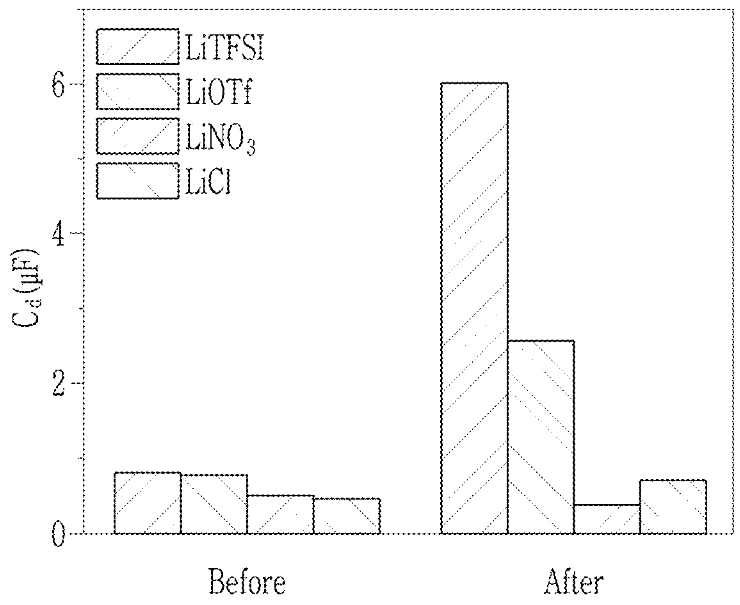

Furthermore, Δf change over time was measured in 9 m of LiTFSI, which is shown in FIG. 5. Referring to FIG. 5, the hydrogen bubble formation was further suppressed at the concentration of 9 m, and Δf up to 5 minutes was almost close to 0.

3. Interaction Between $H_2$ and Electrode Interfacial Layer (IFL)

The same electrochemical cells as in Examples 1 and 2 and Comparative Examples 2 and 3 were manufactured without adding $HClO_4$. These cells correspond to a black graph in FIG. 6. Each cell was measured with respect to CV within a range of −0.7 V to 0.4 V by injecting $H_2$ gas into an electrolyte solution for 20 minutes but maintaining an open circuit (a blue graph of FIG. 6) or applying −0.7 V (a red graph of FIG. 6), and the results are shown in (a) to (d) of FIG. 6. FIG. 6(*a*) corresponds to Example 1 of 6 m of LiTFSI, FIG. 6(*b*) corresponds to Example 2 of 6 m of LiOTf, FIG. 6(*c*) corresponds to Comparative Example 3 of 6 m of LiCl, and FIG. 6(*d*) corresponds to Comparative Example 2 of 6 m of $LiNO_3$.

Referring to FIG. 6(*a*) to (*d*), a fine oxidation peak alone appeared in a state of not applying a negative potential (the blue graph), which was similar to a CV graph of a case of injecting no $H_2$ (a black graph). The reason is that solubility of $H_2$ is low even in an electrolyte solution at a high concentration. On the contrary, the case of applying −0.7 V with the injection of $H_2$ (a red graph) exhibited clearly exhibited a peak according to an electrode-oxidation reaction of $H_2$ to $H^+$ in each CV graph of the LiTFSI electrolyte solution and the LiOTf electrolyte solution and also, twice more current in LiTFSI than in LiOTf. On the other hand, each LiCl and $LiNO_3$ electrolyte solution exhibited almost the same result as a case of applying no potential. The reason is that only when the LiTFSI and LiOTf electrolyte solutions at a high concentration were applied, $H_2$ was stabilized in a dissolved state by the electrode to which the potential was applied.

Figure 7A:
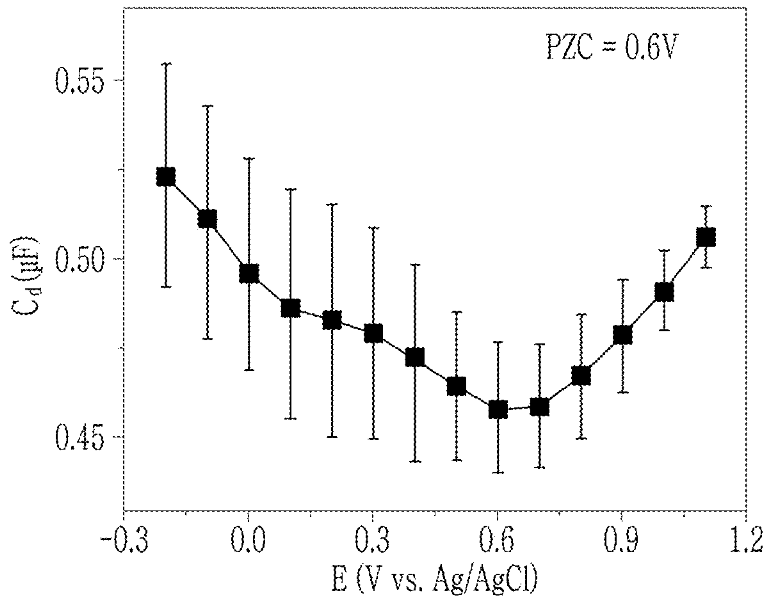
FIGS. 7(*a*) and (*b*) are graphs showing the measured capacitances ($C_d$) as a function of electrode potentials referring to Ag/AgCl on a Pt MDE in 6 m LiTFSI and LiOTf solutions without the addition of $HClO_4$.
Figure 7B:
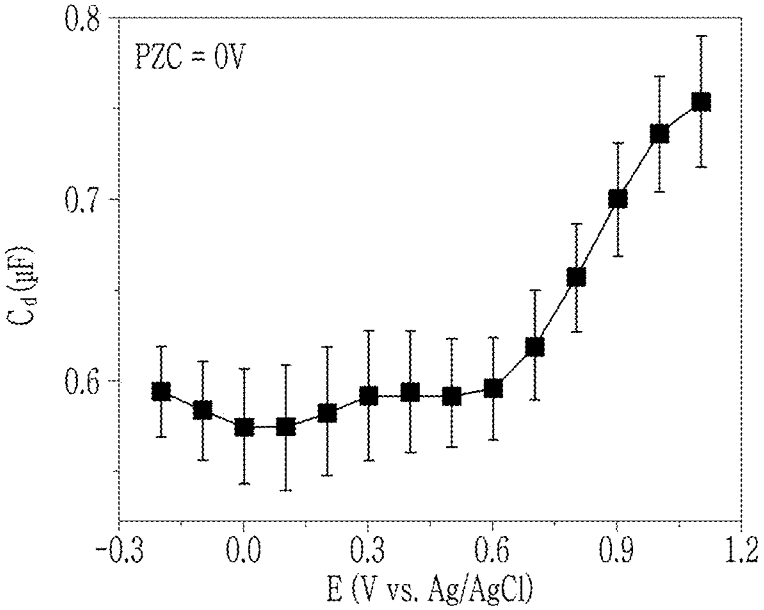
Figure 8A:
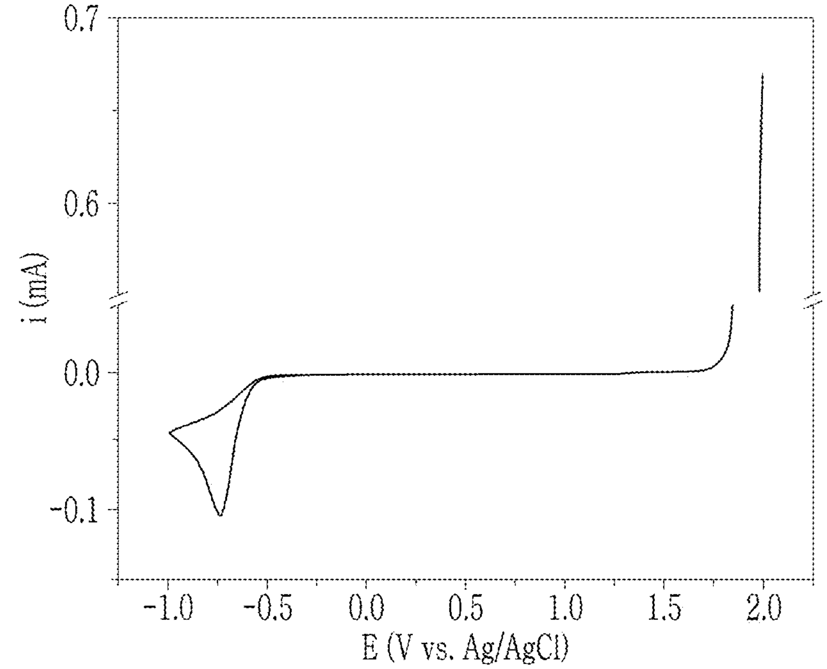
FIG. 8(*a*) is a CV graph of Comparative Example 4.
Figure 8B:
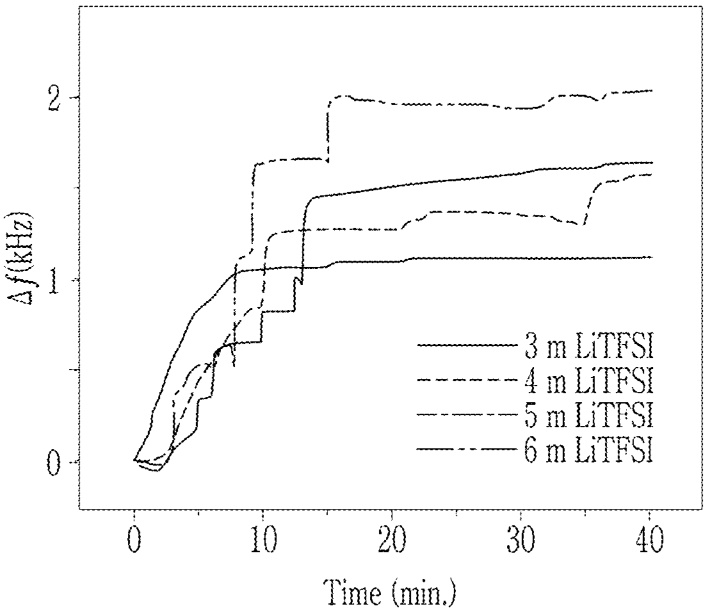
Figure 8C:
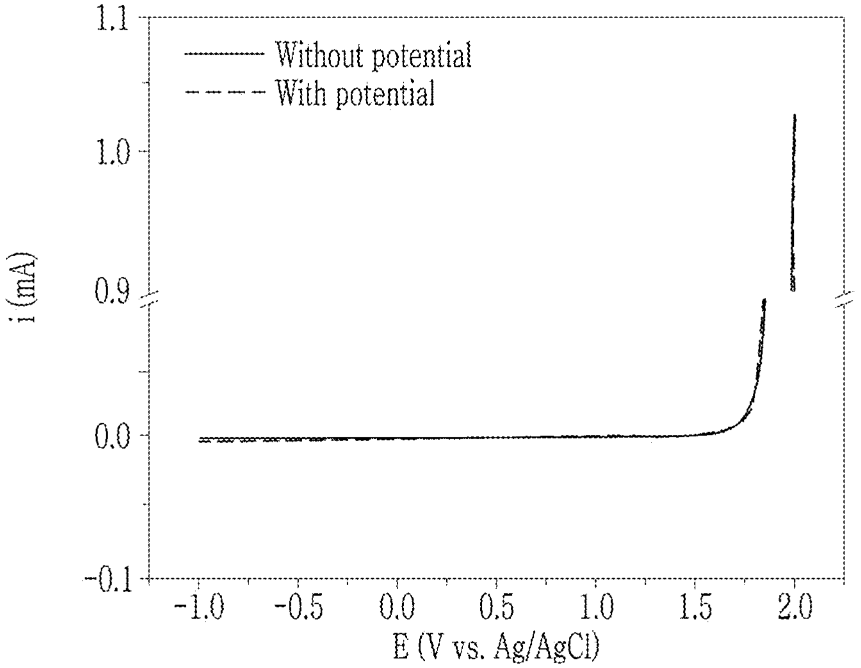
Figure 8D:
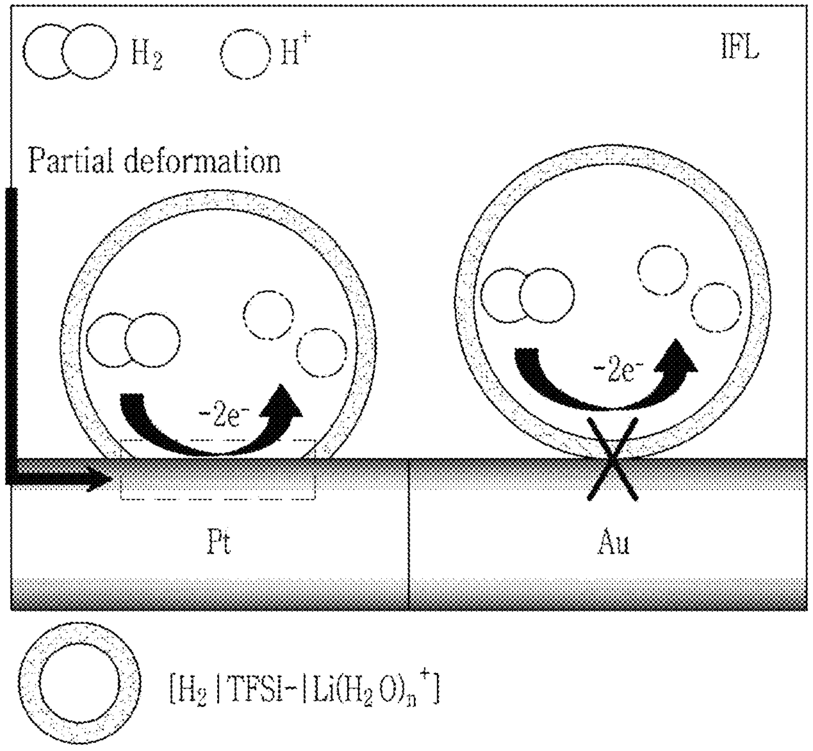

FIG. 7(*a*) is a graph showing FIGS. 7(*a*) and (*b*) are graphs showing the measured capacitances ($C_d$) as a function of electrode potentials referring to Ag/AgCl on a Pt MDE in 6 m LiTFSI and LiOTf solutions without the addition of $HClO_4$. Referring to FIG. 7, PZC (point of zero charge) of Pt in each LiTFSI and LiOTf electrolyte solution was respectively 0.6 V and 0 V. Accordingly, in the two electrolyte solutions, a negative potential was applied to the Pt electrode during the $H^+/H_2$ oxidation-reduction reaction, forming an interfacial layer (IFL_) on the electrode surface to which the negative potential was applied. In addition, the IFL_ had an intermediate phase of 0 V and −2 V (vs. PZC) during the HER, which is understood to include a mixture of anions ($TFSI^-$ or $OTf^-$) and cations ($[Li(H_2O)_n]^+$). FIG. 6(*e*) schematically shows an electrode-oxidation reaction of $H_2$ on the IFL_ of the Pt electrode in 6 m of LiTFSI water-in-salt.

If $H_2$ strongly interacts with the IFL_, $H_2$ takes a space on the layer, eventually forming a porous ion network structure in the IFL_. This may be proved by measuring Ca in the 6 m of electrolyte solutions of Examples 1 and 2 and Comparative Examples 2 and 3 at 0 V and after performing CV for the hydrogen oxidation-reduction reaction at 20 mV/s for 10 cycles, remeasuring $C_d$. FIG. 6(*f*) shows Ca before and after the 10 cycles in each electrolyte solution. Referring to FIG. 6(*f*), before the cycles, the different electrolyte solutions exhibited similar $C_d$, but after the 10 cycles, the LiTFSI electrolyte solution exhibited 6 times increased Ca, and the LiOTf electrolyte solution almost twice increased Ca. These $C_d$ increases after the hydrogen oxidation-reduction reaction mean that the surface areas of the electrode increased to accumulate charges, to which the formation of the porous IFL_ mainly contributed. Such IFL_ is distinguished from SEI formed by decomposition of $TFSI^-$ and the like.

Ultimately, in the electrochemical system according to an embodiment, an ionic interfacial layer may be said to be formed on the surface of a Pt electrode to which a negative potential is applied. The ionic interfacial layer may be a layer that exists only when a voltage is applied or a potential difference occurs but disappears when the potential difference disappears. The ionic interfacial layer may include anions and cations, for example, the ionic interfacial layer may be one in which the anions and cations derived from the salts (LiTFSI, LiOTf, etc.) are ordered, and accordingly, water molecules, a solvent in the ionic interfacial layer, withdraw from the ionic interfacial layer. In the ionic interfacial layer formed on the Pt electrode surface, the oxidation-reduction reaction of hydrogen gas may occur, which suppresses bubble formation of the hydrogen gas.

4. Voltammetry and EQCM Analysis of Au Electrodes

Comparative Example 4

An electrochemical cell was manufactured in the same manner substantially as in Example 1 except that Au MDE was used instead of the Pt MDE as the working electrode.

FIG. 8(*a*) is a CV graph of Comparative Example 4. Referring to FIG. 8(*a*), a peak related to an electrode-reduction of $H^+$ to $H_2$ in the forward scan appeared at −0.73 V, which was lower by −0.38 V than Example 1, and in addition, charge transfer became slower than Example 1. In the reverse direction scan of FIG. 8(*a*), there was no peak related to an electrode-oxidation of $H_2$.

After measuring EQCM by changing a concentration of LiTFSI to 3 m, 4 m, 5 m, and 6 m in Comparative Example 4, a Δf graph over time is shown in FIG. 8(*b*). The result of FIG. 8(*b*) is similar to that of LiOTf, which shows that hydrogen bubbles were not rapidly generated at the Au electrode.

It is known that for the electrode-oxidation of $H_2$ at Au to occur, $H_2$ must be first adsorbed on the Au surface. In the 6 m of LiTFSI electrolyte solution, since Au had PZC (vs. Ag/AgCl) of about 1 V, IFL_ may be regarded to be formed on the Au surface during the reduction process of $H^+$. Accordingly, IFL_ on the Au surface may be considered to have difficulties in absorbing $H_2$. In order to analyze this, after preparing a 6 m of LiTFSI electrolyte solution to which $HClO_4$ was not added, CV was performed by applying −1 V, while injecting $H_2$, and the result is shown in FIG. 8(*c*). In FIG. 8(*c*), there was no electrode-oxidation peak of $H_2$. Accordingly, $H_2$ might be stabilized by IFL_ on the Au surface but was significantly hindered from adsorption onto the Au surface, and as a result, the oxidation-reduction reaction of $H^+/H_2$ is understood to be irreversible. FIG. 8(*d*) schematically shows each different $H_2$ electrode-oxidation mechanism at the Pt electrode and the Au electrode.

While this invention has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

What is claimed is:

1. An electrochemical system, comprising a Pt electrode and a water-in-salt electrolyte solution, wherein the electrochemical system induces a redox reaction of hydrogen gas by applying a negative potential to the Pt electrode, the water-in-salt electrolyte solution includes an aqueous solvent and a salt, the salt includes lithium bis(trifluoromethanesulfonyl)imide (LiTFSI), lithium trifluoromethane sulfonate (LiOTf), lithium bis(fluorosulfonyl)imide (LiFSI), lithium bis(pentafluoroethane sulfonyl)imide (LiBETI), or a combination thereof, a molal concentration of the water-in-salt electrolyte solution is 5 m to 50 m, and formation of hydrogen gas bubbles is suppressed on the Pt electrode to which the negative potential is applied.

2. The electrochemical system of claim 1, wherein the salt of the water-in-salt electrolyte solution is lithium bis(trifluoromethanesulfonyl)imide (LiTFSI).

3. The electrochemical system of claim 1, wherein the molal concentration of the water-in-salt electrolyte system is 6 m to 20 m.

4. The electrochemical system of claim 1, wherein an ionic interfacial layer is formed on a surface of the Pt electrode to which the negative potential is applied.

5. The electrochemical system of claim 4, wherein the ionic interfacial layer exists only when a voltage is applied or a potential difference occurs.

6. The electrochemical system of claim 4, wherein in the ionic interfacial layer, anions and cations of the salt are ordered.

7. The electrochemical system of claim 4, wherein an oxidation reaction of the hydrogen gas occurs in the ionic interfacial layer, thereby suppressing bubble formation of the hydrogen gas.

8. The electrochemical system of claim 1, wherein the negative potential applied to the Pt electrode is −0.1 V to −1.0 V.

9. The electrochemical system of claim 1, wherein the electrochemical system is a fuel cell, a hydrogen storage system, an electrode analysis system, an electrolysis device, a redox flow cell, a capacitor, or a rechargeable battery.

10. A method of suppressing formation of hydrogen gas bubbles on a Pt electrode to which a negative potential is applied and inducing a reversible oxidation-reduction reaction of hydrogen gas, comprising preparing an electrochemical device including raw materials of the Pt electrode, a water-in-salt electrolyte solution, and the hydrogen gas, wherein the water-in-salt electrolyte solution includes an aqueous solvent and a salt, and the salt includes lithium bis(trifluoromethanesulfonyl)imide (LiTFSI), lithium trifluoromethane sulfonate (LiOTf), lithium bis(fluorosulfonyl)imide (LiFSI), lithium bis(pentafluoroethane sulfonyl)imide (LiBETI), or a combination thereof, and a molal concentration of the water-in-salt electrolyte is 5 m to 50 m, and applying the negative potential to the Pt electrode, to suppress formation of the hydrogen gas bubbles on the Pt electrode to which the negative potential is applied and to induce the reversible oxidation-reduction reaction of the hydrogen gas.

* * * * *